United States Patent [19]

Graf et al.

[11] Patent Number: 4,854,841

[45] Date of Patent: Aug. 8, 1989

[54] APPARATUS FOR MANUFACTURE OF AN ARTICLE OF FOOTWEAR HAVING AN OUTER SOLE, AN INNER SOLE AND A LATERAL SOLE

[75] Inventors: Hans-Joachim Graf; Wolfgang Koliwer, both of Achim, Fed. Rep. of Germany

[73] Assignee: Klöckner Ferromatik Desma GmbH, Malterdingen, Fed. Rep. of Germany

[21] Appl. No.: 135,369

[22] Filed: Dec. 21, 1987

[30] Foreign Application Priority Data

Dec. 20, 1986 [DE] Fed. Rep. of Germany ....... 3643820

[51] Int. Cl.4 .............................................. B29C 45/16
[52] U.S. Cl. .................................... 425/119; 264/244; 425/129.2; 425/509; 425/817 R
[58] Field of Search .................. 425/119, 129.2, 129.1, 425/576, 500, 509, 576, 817 R; 264/244

[56] References Cited

U.S. PATENT DOCUMENTS

| | | | |
|---|---|---|---|
| 3,677,678 | 7/1972 | Christie et al. | 425/119 |
| 3,915,608 | 10/1975 | Hujik | 425/119 |
| 4,123,493 | 10/1978 | Schilke et al. | 264/244 |
| 4,125,353 | 11/1978 | Stark | 425/576 |
| 4,734,023 | 3/1988 | Nesch et al. | 425/130 |
| 4,801,256 | 1/1989 | Landwehr et al. | 425/119 |
| 4,810,178 | 3/1989 | Pröll et al. | 425/112 |

FOREIGN PATENT DOCUMENTS

| | | |
|---|---|---|
| 1215353 | 4/1966 | Fed. Rep. of Germany . |
| 64882 | 12/1968 | German Democratic Rep. . |
| 2184638 | 7/1987 | United Kingdom . |

OTHER PUBLICATIONS

Publication No. DESMA 521S-526S, Klöckner-Ferromatik Desma GmbH, entitled "Injection Molding Machine For Direct Attachment Of Soles."

Primary Examiner—Jay H. Woo
Assistant Examiner—Khanh P. Nguyen
Attorney, Agent, or Firm—Watson, Cole, Grindle & Watson

[57] ABSTRACT

An apparatus is provided for molding an article of footwear having an outer sole, a lateral sole and an inner sole, the outer and lateral soles being of an elastomer, and the inner sole being of a thermoplastic or a mixture of isocyanate and a polyol reacting into polyurethane. The outer sole and the inner sole are each injection molded from an elastomer and bonded at their common contact zone by full vulcanization. The outer sole and the lateral sole may each be of different elastomers. The outer sole and the inner sole are bonded together in the area of their contact zone via chemical bonds between the isocyanate and reactive end-groups of substances added to the elastomer.

4 Claims, 10 Drawing Sheets

APPARATUS FOR MANUFACTURE OF AN ARTICLE OF FOOTWEAR HAVING AN OUTER SOLE, AN INNER SOLE AND A LATERAL SOLE

RELATED APPLICATIONS

This application relates to U.S. Ser. No. 116,361, filed Nov. 4, 1987, now U.S. Pat. No. 4,801,256, relates to U.S. Ser. No. 116,666, filed Nov. 4, 1987, now U.S. Pat. No. 4,810,178 and relates to U.S. Ser. No. 942,832, filed Dec. 17, 1986 now abandoned.

BACKGROUND OF THE INVENTION

This invention relates generally to an article of footwear having an outer sole, a lateral sole margin, and an inner sole, and to a process and apparatus for its manufacture.

Such an article of footwear is disclosed in East German Patent No. 64882 in which an outer sole and a lateral sole integrally formed therewith, and of polyvinylchloride, are produced as a unit at a first work station. The inner sole, which may consist of a mixture of isocyanate and a polyol which reacts into polyurethane, is produced at a second work station at which the inner sole is molded simultaneously onto the outer sole, the lateral sole and the bottom of the shoe upper.

At one work station the outer sole and the lateral sole can be formed from molded rubber material which vulcanizes to form a unitary outer sole and lateral sole. The inner sole is then formed of molded rubber material and bonded with the outer sole, the lateral sole and the shoe last. Contact between the vulcanized rubber material of the outer sole and lateral sole with the inner sole is made mechanically in that the mixture that reacts into polyurethane, when considered microscopically, to a certain extent grabs, as if with claws, in the common contact zone which contains fissures. This mechanical bond is adequate in many, circumstances, but may be inadequate, for example, for use as mountain climbing boots, sports shoes for jogging, and the like.

Moreover, since the outer sole and the lateral sole, formed together as a unit, are of the same rubber material, it is not possible to select a different rubber material, for example, a highly abrasion resistant rubber material for the outer sole, and to select a rubber material for the lateral sole which is less abrasion-resistant but nevertheless elastic, so as to provide the necessary cushioning qualities which to a large extent relieves the spinal column of the wearer of concussion-like effects.

Circular turntable installations providing a plurality of molding stations are generally disclosed in Publication No. DESMA 521S-526S, Klickner-Ferromatik Desma GmbH, and entitled "Injection Molding Machine For Direct Attachment Of Soles." The circular turntable installations have two devices for the mixing of isocyanate and a polyol into a mixture reacting into polyurethane which, depending on the mixing ratio and the additives, reacts into a wear-resistant outer sole or a flexible inner sole.

The circular turntable is rotated incrementally for molding the outer soles and the inner soles. The molding stations are stopped during incremental movement and interlocked when stopped relative to the two mixing and injection devices.

These devices are located along the periphery of the turntable and are movable in a radial direction toward the turntable. The molding apparatus at each station has two lateral molding elements which, in a mold closed position, define an opening and two sprue channels.

A vertically movable last turning body is mounted on the apparatus above the lateral mold elements, the body having a counterstamp and a shoe last for supporting the shoe uppers.

A vertically adjustable bottom stamp is located below the lateral mold elements. The bottom stamp, lateral mold elements in their mold closing position and the counterstamp together define a mold cavity into which the mixture reacting into the outer sole is introduced. The bottom stamp which contains the molded outer sole, the lateral mold elements in a mold closed position, and the shoe last which supports the shoe upper together define a mold cavity for molding the inner sole as the mixture reacting into the inner sole is introduced into the mold cavity which, in the course of the reaction, bonds to the outer sole and to the shoe upper.

U.S. Ser. No. 942,832, among the aforementioned related applications, discloses molding stations on a circular turntable for the molding of shoe soles with an outer sole of elastomer and an inner sole of polyurethane.

For the molding of the outer sole of elastomer, there is provided, in lieu of a previously employed device for mixing the mixture reacting into polyurethane, a plastification and injection aggregate device for plastification of the elastomer, as employed in injection molding machines for the processing of thermoplastic synthetic materials, and for injection of the elastomer into the outer sole mold cavity. Since high pressures occur during the injection of the plastified elastomer, the molding apparatus at each station is provided with an upper, vertically adjustable cross block supporting a pivotably mounted mold carrier with pairs of opposing heatable mold parts lying parallel to the pivot axis, each mold part defining a mold cavity for the outer sole and including cooling channels.

A lower, vertically adjustable cross block below the first cross block has a heatable plate facing the mold carrier and cooperates with the heatable mold parts thereof for the production of outer soles. Above the upper vertically moveable cross block is a fixed cross block having an opening into which a heatable mold part with a molded outer sole in its mold cavity projects and combines together with laterally movable mold elements, located above the fixed cross block, for the molding of an inner sole of polyurethane.

The mixtures which react into polyurethane for the outer sole and/or for the inner sole essentially consist of a polyol and isocyanate, as well as chain extenders and catalysts, which are adjusted by the respective additives for the desired material properties of the outer soles and/or inner soles, whereby the outer sole is rendered wear resistant and the inner sole flexible having a porous structure.

The chemical reaction starts with the mixing of the components. In the mold, the mixtures react into outer soles or inner soles. During the reaction into the inner sole, the molding of the sole takes place simultaneously with the bonding to the shoe upper and to the outer sole.

The outer sole of elastomer and the inner sole of polyurethane are bonded in the area of their contacting surfaces by chemical bonds between isocyanate and reactive end groups of the substances added to the elastomer.

As likewise employed for the present invention, the mixtures reacting into polyurethane are mixtures on the basis of ether or esterpolyols, containing on the basis of 100 parts by weight:

30–100 parts by weight isocyanate;
0.1–10 parts by weight catalyst;
the remainder chain expanders; and
other usual additives.

The catalyst which may be used is DABCO-SB produced by Airproducts Company.

The outer soles are made from elastomers which can be mixed with the following chemical compounds or chemical substances in quantitative shares of 0–20 phr, relative to the rubber amount: e.g., acryl-nitryl-rubber, styrol-butadiene-rubber, natural rubber, chloroprene-rubber.

The outer soles can generally be produced from any known rubber quantities if, for example, the following substances are mixed in quantities of 0–20 phr (quantity relative to the amount of rubber used):

phenolformaldehyde resins, e.g.
   Vulkadur A (Bayer AG)
   Coretack (BASF)
methylolized phenolformaledhyde resins, e.g.:
   SP 1045 (Krahn)
   Korever (BASF)
resorcin in connection with a formaldehyde dispenser, e.g.:
   Cohedur A (Bayer AG)
   Cohedur RS (Bayer AG)
   Cohedur RK (Bayer AG)
silicic acid fillers, e.g.:
   Vulkasil S (Bayer AG
   Ultrasil (Degussa)
aminoalcohol, e.g.:
   3-amino-propanol
primary or secondary amine, e.g.:
   Stearylamine
polyvinylalcohol, e.g.:
   Mowiwol (Hoechst)
   VSH 72 (AIR PRODUCTS)
   VSH 73 (AIR PRODUCTS)
high hydroxylgroup containing polyol, e.g.:
   Formrez (Witco)
Acrylate rubber (ACM) e.g.:
   Hydrin (Polysar)
   Hercolor (Hercules)
or a combination of the above substances.

The formation of the outer sole of the elastomer is carried out in such a manner that the elastomers plastify at the usual processing temperatures and are injected into the mold cavities according to the usual technology and corresponding high pressures of injection molding machines.

The control of the temperature of the elastomers is carried out such that the temperature of the injected outer soles is cooled to just below the decomposition temperature of the polyurethane for the inner sole to be produced and then the mixture reacting into the polyurethane is brought into contact with the outer sole, whereby in the contacting surfaces between the elastomer and the reacting polyurethane isocyanate reacts with the reactive end groups.

SUMMARY OF THE INVENTION

It is therefore an object of the invention to provide an article of footwear having an outer sole, a lateral sole and an inner sole, such that the same or different rubber materials may be selected for the outer and lateral soles, and the mechanical bond between the shoe upper and the lateral sole, between the inner sole and the shoe last, and between the outer sole and the inner/lateral soles, is greater compared to prior articles of footwear of this type, so that the shoe is capable of withstanding higher load pressures during use, and a loosening of the sole or its components (outer, inner and lateral soles) is substantially avoided.

Another object is to provide such an article of footwear in which the bond between the lateral sole and the inner sole, as well as between the outer sole and the inner sole, can withstand extremely demanding conditions.

A further object is to provide a process and apparatus for the manufacture of such article of footwear.

In accordance with the invention, the outer sole and the lateral sole each comprise an injection-molded elastomer bonded together at their common contact zone through full vulcanization. Since the outer sole and the lateral sole are each of an injection-molded elastomer, extremely high mold-locking pressures otherwise attendant the molding operation can be avoided.

Prior to bonding through full vulcanization, the lateral and outer soles are partially vulcanized. By controlling the temperature of the elastomers during vulcanization, such as by raising or lowering the temperature by 10° C. which respectively leads to a lessening or an increase by 50% of the vulcanization time, the interval during which each elastomer is fully reacted can be controlled.

The temperature distribution between the zones of contact between the inner, outer, and lateral soles, is adjusted by the provision of heating and cooling passages provided in the mold parts such that full vulcanization is delayed between the outer and lateral soles until they are moved into contact with one another.

After the lateral sole margin is first molded onto the periphery of the shoe last, the inner sole is molded to the bottom of the last in the space bounded by the lateral sole. The inner sole material may consist of a thermoplast such as, for example, polyvinylchloride or a granulated plasticized polyurethane. Otherwise, the inner sole material may consist of a mixture of isocyanate and a polyol which reacts into polyurethane, such that the inner and lateral soles may be bonded together by full vulcanization after completion of the chemical reactions chemically bonding such soles together.

In describing the present invention, the terms injection molded outer sole and injection molded lateral sole are intended to mean plasticized elastomers injected into mold nests or cavities and then vulcanized at the contact area between the two soles and thereafter fully vulcanized in all areas of contact following unification of the outer and lateral soles.

The outer sole and the lateral sole may each consist of a different elastomer. Thus, an elastomer may be selected for the lateral sole having a greater cushioning compared to that of the outer sole elastomer.

And, the inner sole may consist of a mixture of isocyanate and a polyol which react to form a polyurethane, such that the lateral and inner soles, and the outer and inner soles, respectively, are chemically bonded to one another at their areas of contact by the chemical bonds between the isocyanate and reactive end group substances added to the elastomer.

References to elastomers made throughout the present application may be understood to mean known rubber mixtures. By thermoplastics it is meant, according to the invention, the typical thermoplastics such as, for example, polyvinylchloride, and the mixture of isocyanate and a polyol reacting into polyurethane, which are plasticized and processed after granulating similar to the typical thermoplastics. And, according to the invention, the term "mixtures reacting in the polyurethane" are understood to mean those which are known in the manufacture of shoe soles from polyurethane. Furthermore, these "mixtures", are understood to mean those which appear in chemical bonds with isocyanate.

In accordance with the process for the manufacture of articles of footwear having an outer sole and a lateral sole of elastomer and an inner sole of a thermoplastics or a mixture of isocyanate and a polyol reacting into polyurethane, when molding an outer sole and a lateral sole of elastomer and an inner sole of a mixture reacting into polyurethane onto a shoe upper, the lateral sole of elastomer is molded onto the shoe upper and is fully vulcanized except in the area which it and the outer sole come into contact. The inner sole is bounded by the lateral sole and is molded to the shoe upper, and the outer sole of the same or different elastomer is molded similarly as the lateral sole and is fully vulcanized except for the area of contact with the lateral sole. The outer sole is brought into contact with the lateral sole and the innersole, and the outer sole and the lateral sole are bonded together at the common area of contact by full vulcanization.

And, in accordance with the process of the invention for the manufacture of articles of footwear with an outer sole and a lateral sole of an elastomer and an inner sole of a mixture of isocyanate and a polyol reacting in a polyurethane, such that chemical bonds are formed between the lateral and inner soles, as well as the outer sole and inner sole, the lateral sole and the inner sole, as well as the inner sole and outer sole are respectively bonded to one another in the area of their boundary surfaces by isocyanate and reactive end groups of substances added to the elastomer.

Further in accordance with the invention, at least one catalyst is added to the mixture to influence the reaction speed of a mixture containing a polyol and isocyanate reacting in polyurethane, such that substances are added to the elastomer which contain reactive end-groups entering into chemical bonding with isocyanate, and the reaction speed for forming the polyurethane and the temperature of the elastomer controlled in such a manner that the chemical bonds in the area of the boundary surfaces of the elastomer and the reacting mixture are formed. Thus, a bond is created between the outer sole, the lateral sole and the shoe upper that withstands extreme stress loads during shoe use.

The invention further provides for an apparatus according to one embodiment for carrying out the aforedescribed process, which may be particularly adapted for circular turntable installations, such that the molding station has a vertically movable upper cross block, and a mold carrier mounted on the cross block for pivotal movement above a transverse axis. The mold carrier has a first pair of opposed outer surfaces and a second pair of opposed outer surfaces perpendicular to the first surfaces. A pair of opposing lateral mold elements is mounted on the frame structure above the upper cross block, and a shoe last on a shoe last holder is mounted on the frame. The lateral mold elements are spaced apart in a closed position against the last, and a heatable first mold part on one of the first surfaces projects in a first position into the spacing between the lateral mold elements to define therewith a lateral sole mold cavity into which an elastomer is injected to form a lateral sole. A second mold part on one of the second surfaces engages, in a second position, with the undersurfaces of the lateral mold elements to define with the interior of the lateral sole and with the shoe last an inner sole cavity into which a thermoplastics is injected, or into which a mixture of isocyanate and a polyol reacting into polyurethane is injected, to form an inner sole. A third mold part is mounted on the other of the second surfaces, and a vertically movable lower cross block having a nested mold part is engageable, in the second position, with the third mold part to define therewith an outer sole cavity into which an elastomer in injected to form an outer sole simultaneously with the formation of the inner sole. The nested mold part is engageable in a third position with the under surfaces of the lateral mold elements for placing the outer sole into engagement with the inner and outer soles, and a mechanism is provided similar to that of the aforementioned U.S. Pat. No. 4,801,256 for pivoting the mold carrier between the first, second and third positions.

Thus, the lateral sole is injection molded in a first work phase, and inner and outer soles are simultaneously injection molded in a further work phase.

In accordance with another embodiment, the first mold part is instead mounted on one of the second surfaces of the mold carrier, and the second mold part is mounted on one of the first surfaces thereof. Thus, the lateral and outer soles are simultaneously injection molded in a first work phase, and the inner sole is injection molded in a further work phase.

And, according to the invention, the mold parts and elements include means for vulcanizing the soles.

BRIEF DESCRIPTION OF THE DRAWINGS

FIG. 1a is a perspective view of an article of footwear manufactured in accordance with the invention, with the toe section removed by transverse cutting to illustrate the inner, outer, and lateral sole construction;

FIG. 1b is a cross-sectional view taken substantially along the line 1b–1b of FIG. 1a;

DETAILED DESCRIPTION OF THE INVENTION

Figure 1:
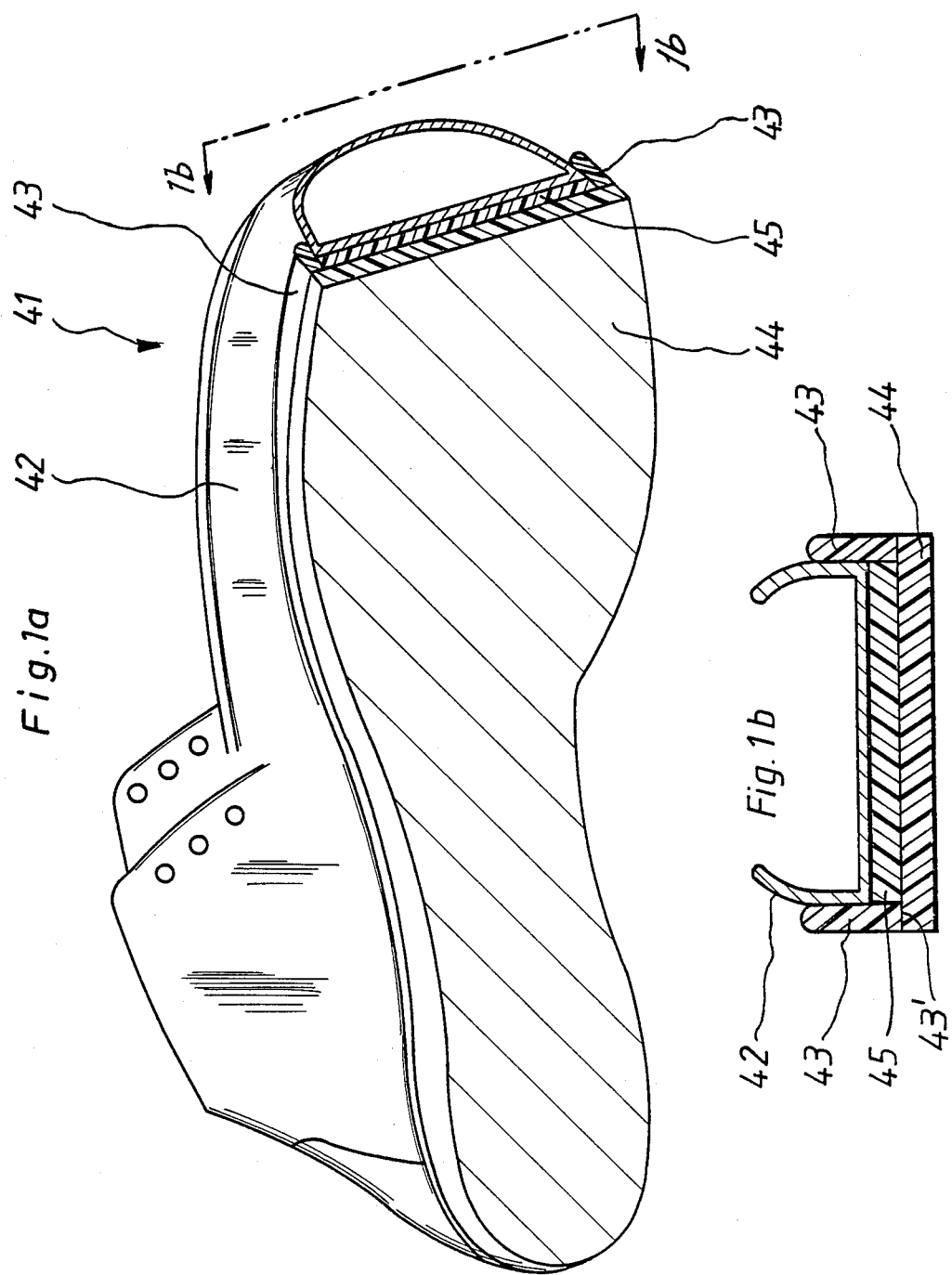

An article of footwear, such as a shoe or a boot generally designated 41 in FIG. 1a, is shown broken away at the toe section to illustrate the multi-part sole construction of the invention. The shoe includes a shoe upper 42 of usual construction, a lateral sole margin 43, or welt, surrounding the periphery of the shoe upper, an outer sole 44 and an inner sole 45. The shoe construction is shown in plan in FIG. 1b.

The lateral sole and the outer sole are injection molded as separate sole elements, from the same or different elastomers. They are bonded together at a common contact area by full vulcanization.

The inner sole may consist of a thermoplast coated with a sponging agent, or of a mixture of isocyanate and a polyol reacting into polyurethane in which a know sponging agent is added.

In the event the aforementioned additives are added to the mixture reacting into polyurethane and the appropriate catalysts are added to the elastomers, the chemical bonds between the isocyanate and the mixture reacting in the polyurethane are formed from the elastomer of the lateral margin and the outer sole.

And, a welding of the thermoplastics with the elastomer can be effected by adjusting the mixture's cooling and heating intervals.

Figure 2:
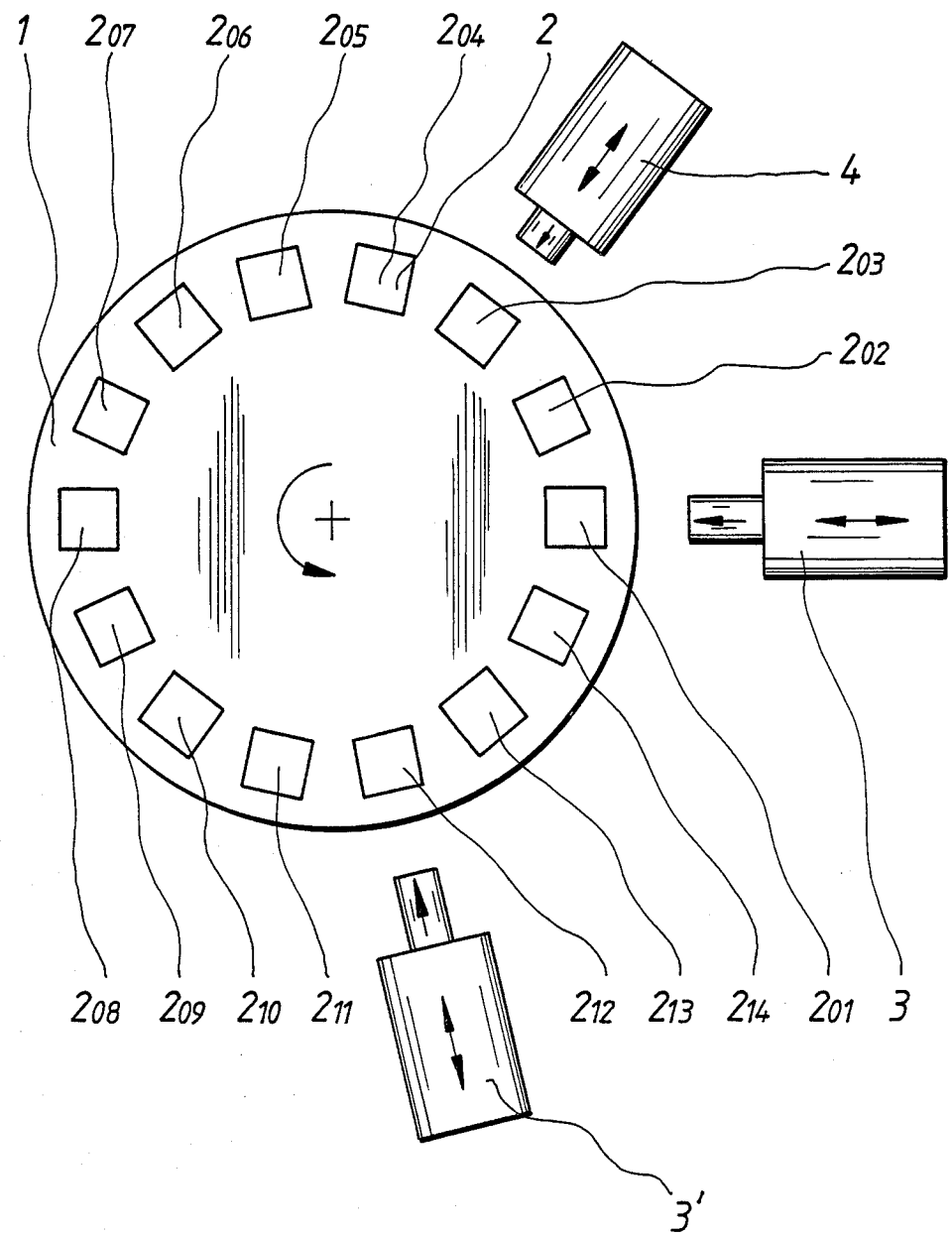
FIG. 2 is a schematic top plan view of a circular turntable showing a plurality of stations at each of which an apparatus according to the invention is located, injection devices for the outer and lateral sole materials, and a mixing/injection device for the inner sole material being shown relative to the turntable.

Circular turntable 1 in FIG. 2 illustrates 14 molding stations 2 arranged equally spaced and schematically illustrated by squares. The squares also illustrate the positions which the molding stations assume during the incremental rotation of the turntable. With the present arrangement, each mold station will reach its original position after incremental turns of the turntable. The positions are designated $2_{01}$ to $2_{14}$.

Radially disposed plastification and injection aggregate devices 3 and 3' for the same or different elastomers are located adjacent the periphery of the turntable for respectively injection molding the outer and lateral soles. After each incremental movement of the turntable, i.e., equal to a 1/14th turn, device 3 is locked in some normal manner relative to one of the molding stations 2 shown in position $2_{01}$, and is capable of shifting radially relative to the turntable. Similarly, device 3' is locked in some normal manner relative to station $2_{12}$ and is capable of shifting relative to the turntable. When so locked, an elastomer is injected by device 3 into the mold cavity to form lateral sole margin, and plastified elastomer is injected by the other device 3' into the mold cavity for forming the outer sole.

Also arranged in a radially shiftable manner relative to the turntable is a device 4 for the mixing of the mixture reacting into polyurethane. After each incremental turn of the turntable this device can also be interlocked with one of the work stations which had been rotated to the corresponding work station $2_{03}$, so that material for molding the inner sole is injected into the mold cavity of the apparatus. Depending on the reaction of vulcanization time of the materials used, devices 3 and 4 can be interchanged from that shown.

Molding apparatus 2 is shown in detail in FIGS. 3 to 7 in various working positions as viewed in the direction of the single arrows on devices 3 and 4 of FIG. 2.

Figure 3A:
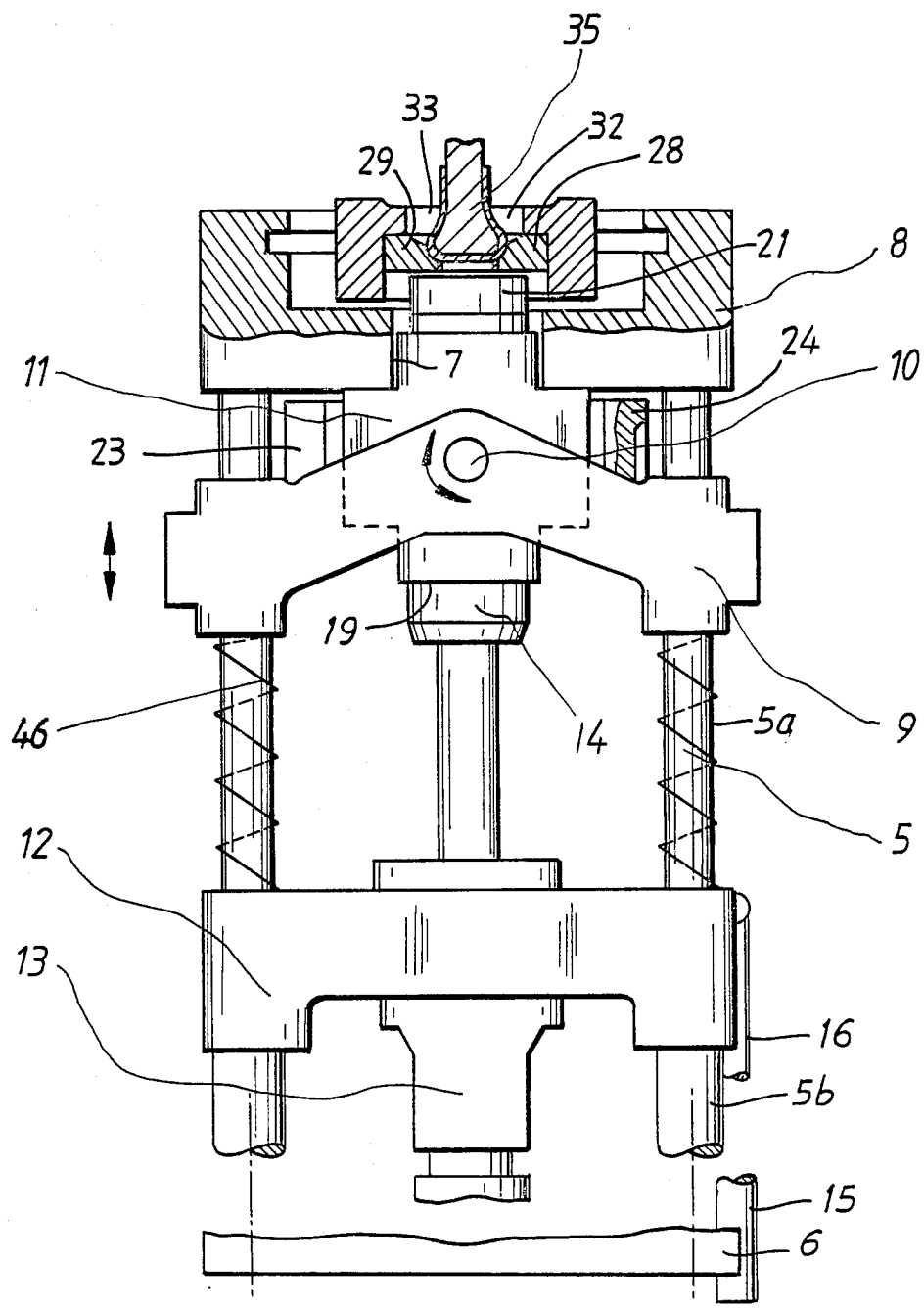
FIGS. 3a and 4 to 7 are schematic views in side elevation of the details of one embodiment of the present apparatus for illustrating the various operations thereof carried out during the molding operation.
Figure 3B:
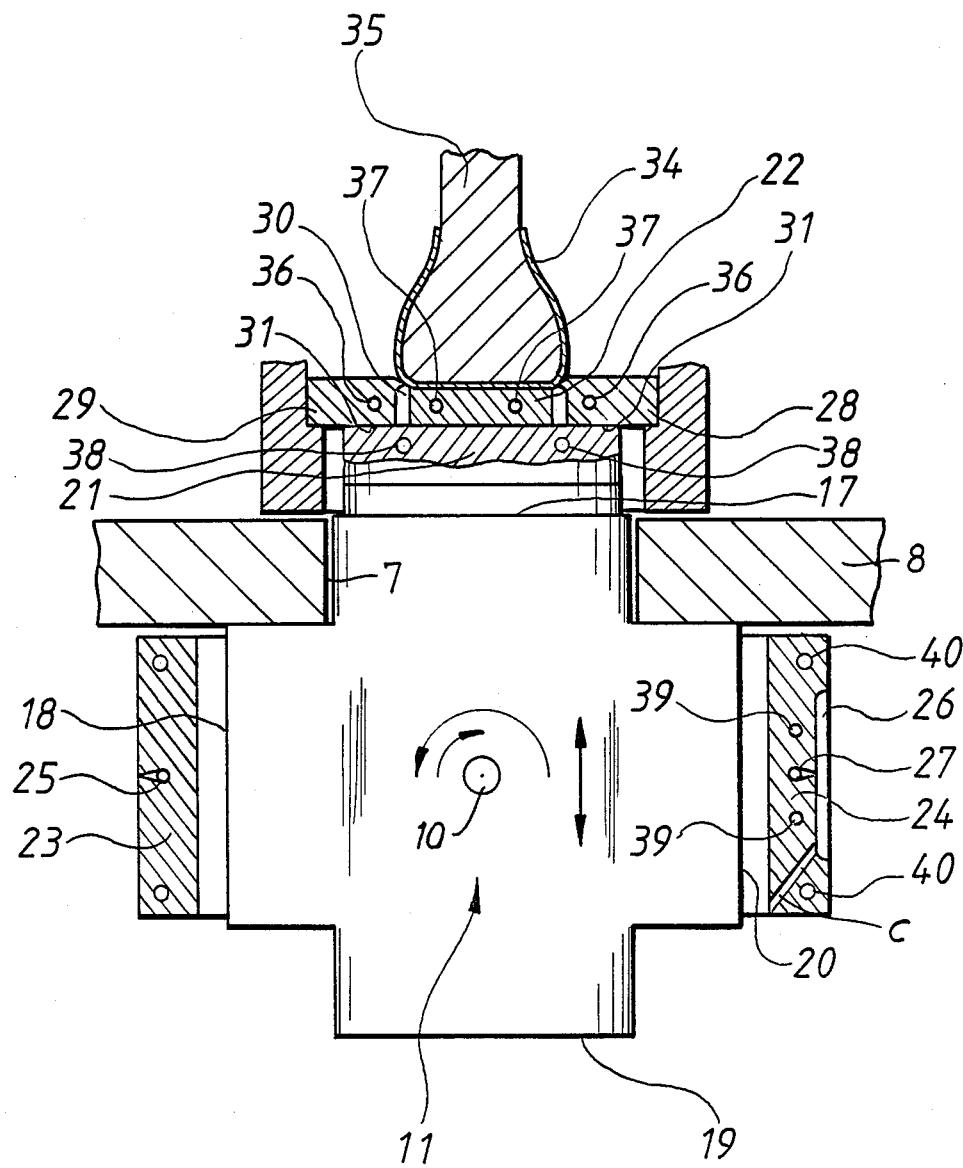
FIG. 3b is a view similar to 3a, in enlarged view, of the pivotable mold carrier in relation to some parts of the machine, with various other machine parts being omitted for clarity.
Figure 4:
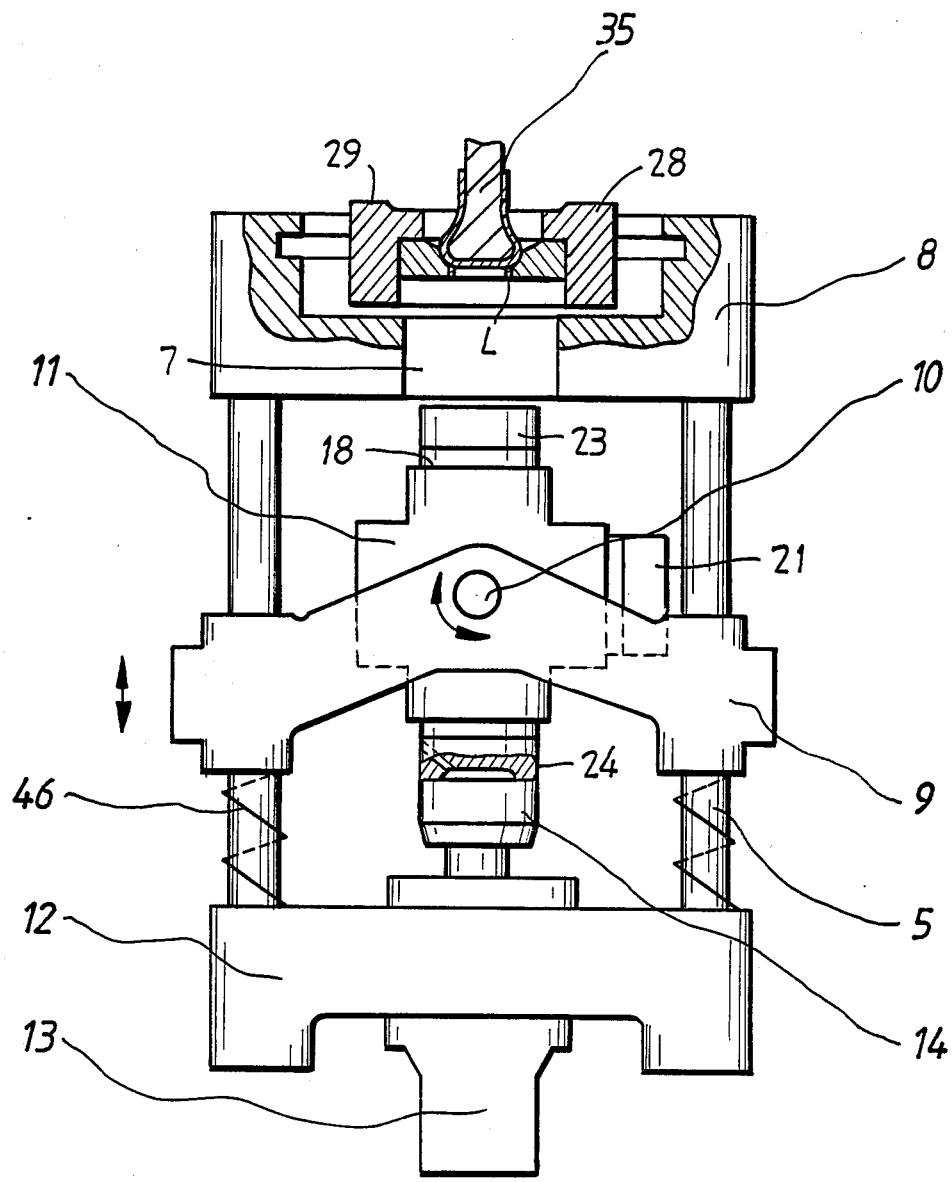

The mold parts of molding apparatus 2 of FIG. 3a for the molding of the lateral sole are shown in closed position. FIG. 3b is an enlarged view of the mold carrier in the position shown in FIG. 3a for effecting the molding of the lateral sole.

The apparatus has a generally upstanding frame structure which includes four spaced apart upstanding guide posts 5, of which only two are visible. A lower fixed cross block 6 and an upper fixed cross block 8, having a central opening 7, form a fixed guide frame together with guideposts 5 fixed at opposite ends to blocks 6 and 8. An upper, vertically movable cross block 9 is mounted for sliding movement along guidepost sections 5a of a smaller diameter compared to guidepost sections 5b. A mold carrier 11 is mounted on block 9 for pivotable movement about the central axis of transverse pivot rod 10. A lower, vertically movable cross block 12 is arranged for sliding movement along large diameter sections 5b of the guideposts. The frame structure as aforedescribed and the shifting movement of cross blocks 9 and 12 together with the pivotable mold carrier, are the same as that disclosed in the aforementioned U.S. Ser. No. 116,361. The entirety of that frame structure and operation is therefore specifically incorporated herein by reference.

Hydraulic or pneumatic piston and cylinder units 15, 16 extend between cross blocks 12 and 6 for vertically moving both cross blocks 9 and 12 into the mold closing position of FIG. 3a in which mold carrier 11 is fully extended so as to bear against cross block 8 adjacent its central opening. A mold locking cylinder 13 operating between blocks 6 and 12 locks the cross blocks in the mold closing position. And, a heatable plate 14 mounted on cross block 12 bears against an external face 19 of the mold carrier in the FIG. 3a position.

As shown in more detail in FIG. 3b, mold carrier 11 is of cruciform shape having a first pair of opposing, external surfaces 17, 19, and a second pair of opposing, external surfaces 18, 20 perpendicular to the first surfaces. The mold carrier may otherwise be of rectangular cross-section without departing from the invention.

An insulating or spacing plate 21 is mounted on surface 17, and a mold part 22 of smaller size is mounted on plate 21.

Mold parts 23 and 24 are respectively mounted on surfaces 18 and 20, plate 23 having a sprue borehole 25 opening at the outer surface thereof, and plate 24 having a mold nest 26 of a predetermined size and shape for the formation of a molded outer sole. A sprue bore hole 27 in plate 24 opens into nest 26.

And, mold part 24 has a plurality of suction channels C (only one being shown for clarity) connected to a vacuum source (not shown) for suctioning the molded outer sole for supporting it in nest 26 during pivotal movement of the mold carrier, as will described in more detail hereinafter.

A pair of opposing, laterally movable side mold elements 28, 29 are mounted on the upper surface of cross block 8. The lateral mold elements are shown throughout the drawings in a mold closed position against a shoe last 34 with their sealing rims 32, 33, (FIG. 3a) abutting against opposite sides of an upper portion of shoe last 34 mounted on a shoe last holder 35. The last holder is part of a known, vertically shiftable last mount (not otherwise shown) having a revolving last body which can be pivoted about an axis parallel to pivot rod 10.

In the pivotable position of the mold carrier shown in FIG. 3b, surface 17 confronts undersurfaces 31 of lateral mold elements 28, 29, and plate 21 abuts against these undersurfaces. Mold part 22 projects into the space between the lateral mold elements so as to define therewith a lateral mold cavity 30 extending around the lower peripheral edge of the shoe last. Plasticized elastomer is then injected through a sprue runner (not shown) into mold cavity 30 which is bordered by the lateral mold elements in the FIG. 3b closed position on their plane of contact.

Heating channels 36 are provided in the lateral mold elements, and cooling channels 37 and 38 are respectively provided in mold part 22 and in plate 21 to effect full vulcanization of the lateral sole except for its outer edge surface 43' (see FIG. 1b). As soon as this vulcanization has taken place to an extent sufficient to solidify the lateral sole, the pivotable mold part carrier is retracted away from cross block 8 such that plate 21 with its mold part 22 disengages from the lateral mold elements. The pivotable mold carrier may then be pivoted through 90° in a clockwise direction, when viewed in FIG. 3b, and again extended upwardly so that surface 18 now confronts undersurfaces 31 of the lateral mold elements and mold part 23 engages these undersurfaces (see FIGS. 4 and 5). The extension and retraction movements of the mold carrier and the pivotable movement thereof are carried out in the same manner as described in the aforementioned related U.S. Pat. No. 4,801,256 It is therefore believed unnecessary to repeat those operations in detail. In the FIG. 5 position, mold part 23 defines with the interior of molded lateral sole L an inner sole cavity IC together with the underside of the shoe last. A mixture of isocyanate and a polyol reacting into polyurethane or a thermoplastics coated with a sponging agent, is then injected by device 4 into mold cavity IC via sprue bore hole 25 for injection molding the innersole.

To facilitate rotation of the mold carrier, lower cross block 12 is moved toward fixed cross block 6 sliding along guidepost sections 5b, and block 9 slides along guidepost sections 5a and is stopped as it bears against shoulders (not shown), or the like, at the transition between the different diameter sections 5a, 5b. Pressure springs 46 encircling guidepost sections 5a permit block 9 to stop at the aforementioned shoulders while block 12 moves slightly further away therefrom to provide a clearance between the mold carrier and heat plate 14. The mold carrier may then be pivoted from its FIG. 3 to its FIG. 4 position through 90° by actuation of some suitable drive means so that mold part 24 now confronts heat plate 14 and mold part 23 confronts opening 7 of cross block 8.

Figure 5:
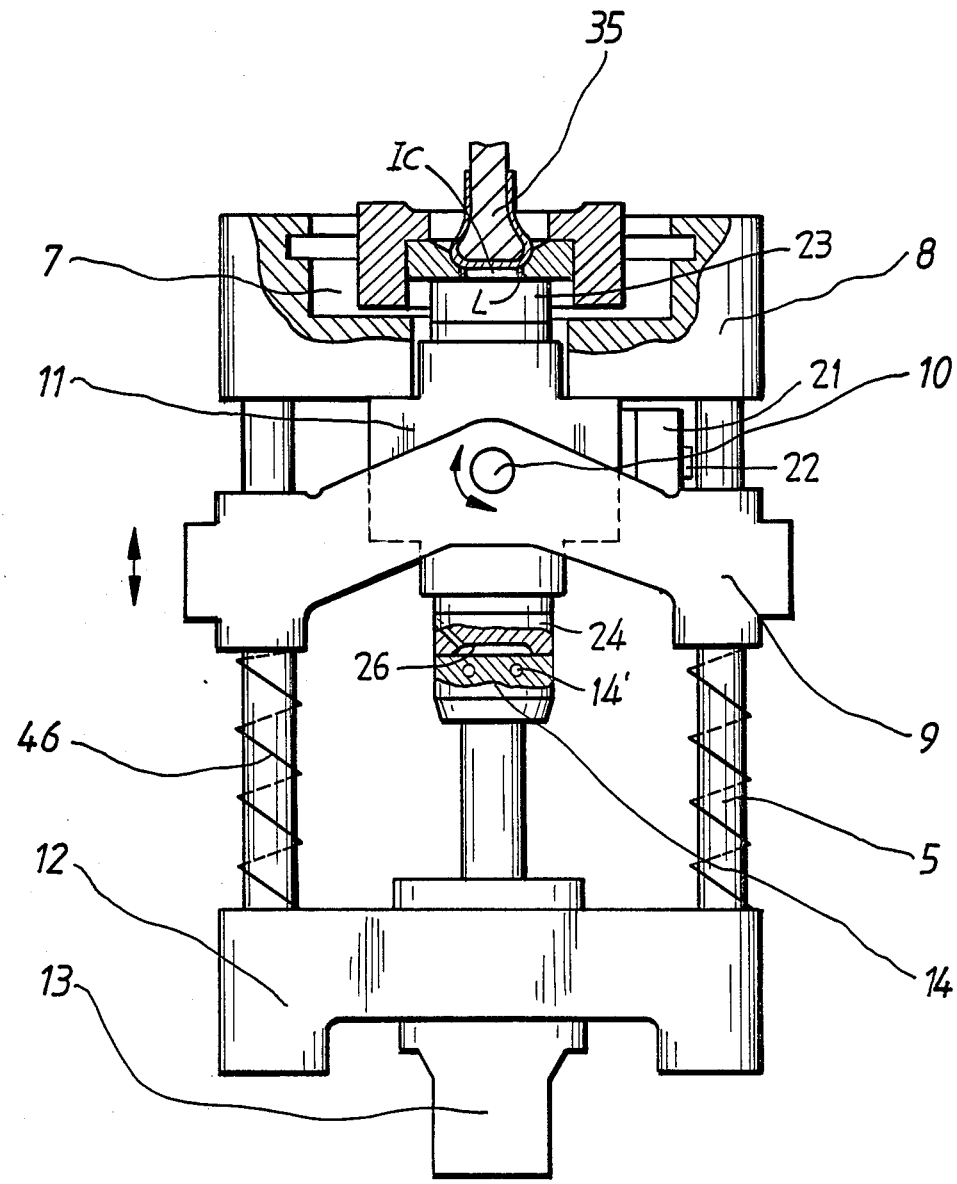

Upward movement of cross block 12 is transmitted to cross block 9 via springs 46 for extending the mold carrier to its FIG. 5 position. And, mold locking cylinder 13 is actuated for engaging heat plate 14 with mold part 24.

Plasticized elastomer is injected into the mold cavity defined by nest 26 and the confronting heat plate 14, via device 3' for molding an outer sole. By adjusting the temperature distribution via heat passages 14' in plate 14, heat passages 39 in plate 24 and cooling passages 40 in plate 24, the outer sole is satisfactorily solidified through vulcanization, and the contact zone with the lateral sole will be partially vulcanized to the highest extent practical in the final mold position of FIG. 7.

In the FIG. 5 position, the inner sole and outer sole are simultaneously molded.

Figure 6:
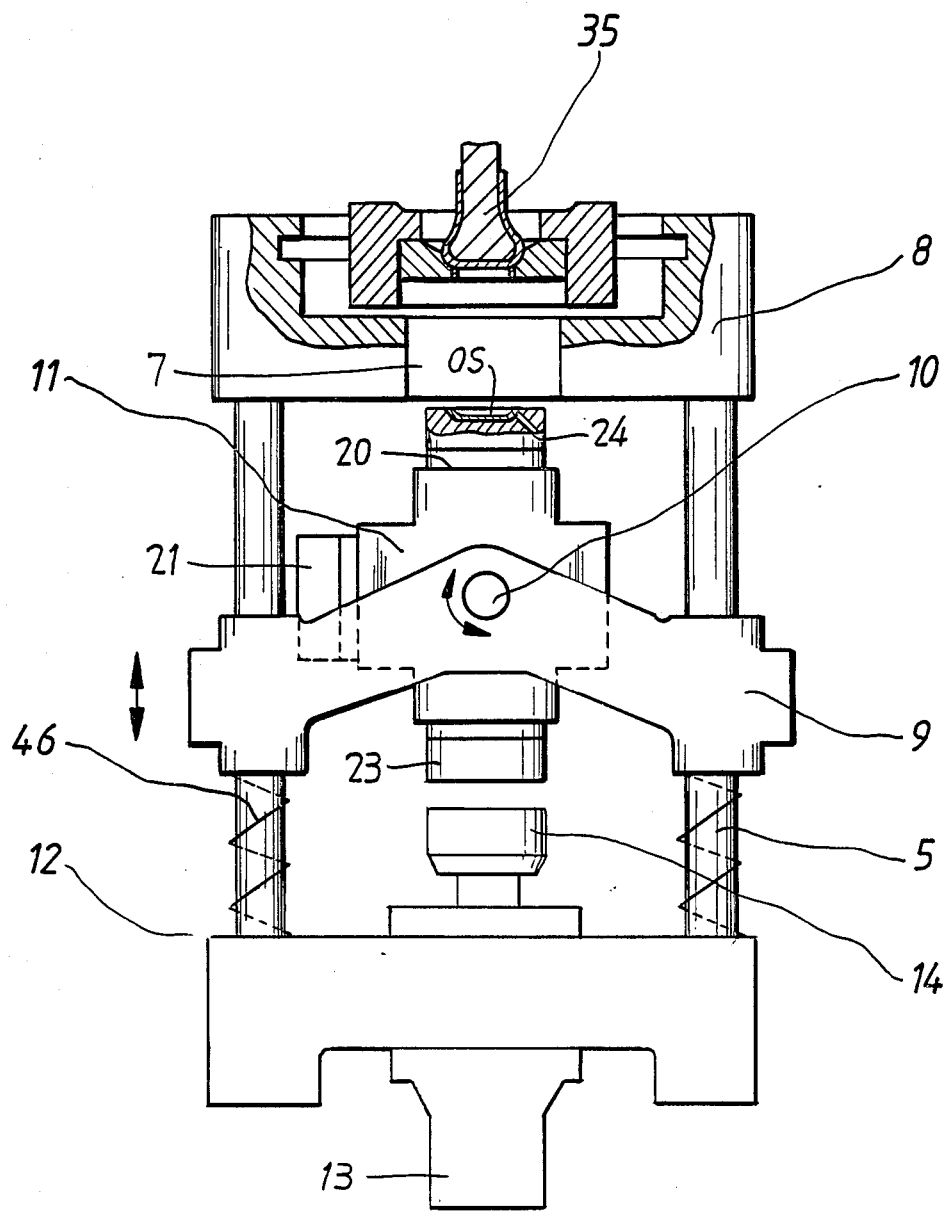
Figure 7:
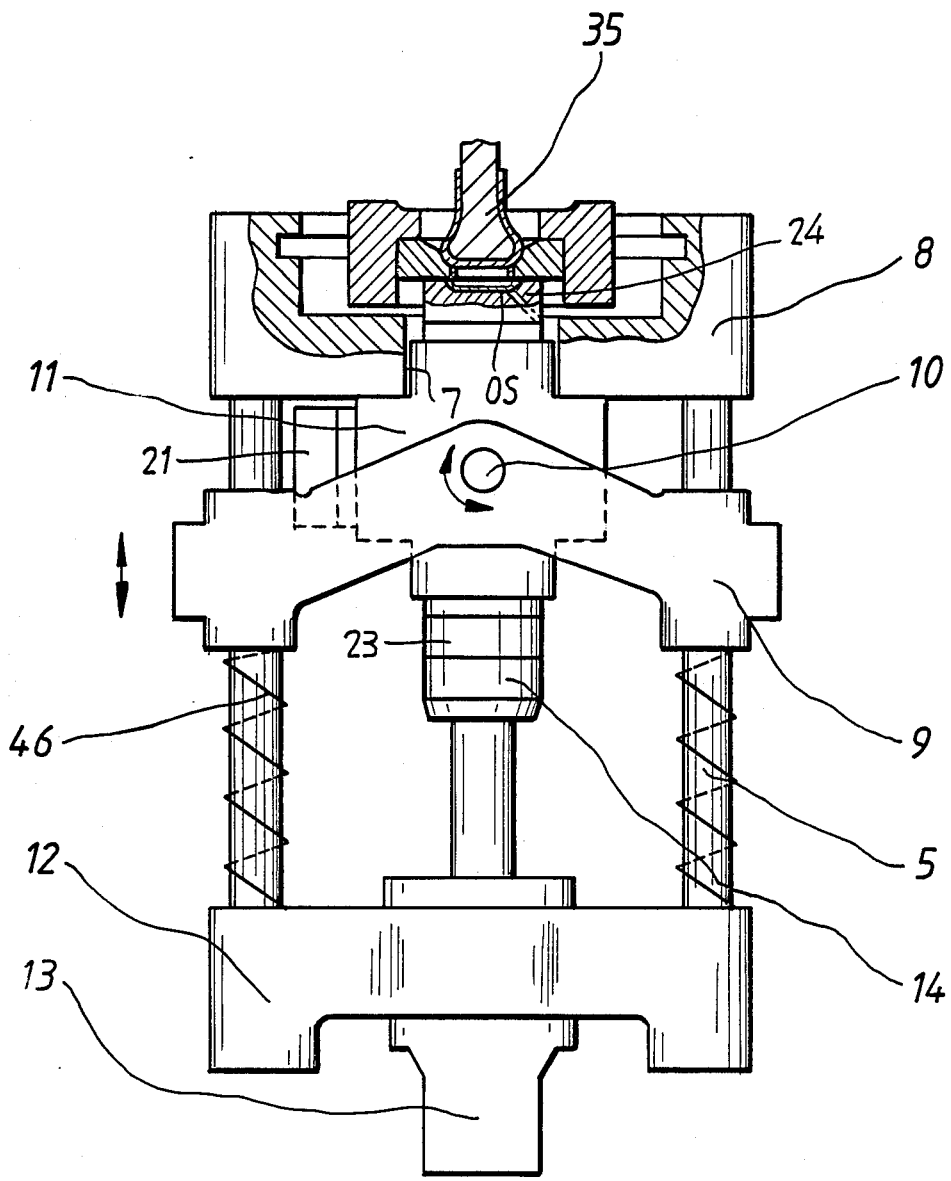

Thereafter, cross block 9 is retracted for shifting the mold carrier away from cross block 8 to its FIG. 6 position in which the mold carrier is shown as having been rotated (either clockwise or counterclockwise) through 180° such that mold part 24 now confronts opening 7 of cross block 8. And, suction channels C are actuated for retaining the molded outer sole OS within nest 26 as the mold carrier is rotated through 180° from its FIG. 5 to its FIG. 6 position. Cross block 9 is then shifted upwardly so as to extend the mold carrier to its FIG. 7 position at which mold part 24 engages the undersurfaces of the lateral mold elements, and mold locking cylinder 13 is actuated for locking the cross blocks in this mold closing position. Pressurized air may then be directed through passages C to assist in the release of molded outer sole OS which, upon adjustment of the heating and cooling channels of mold part 24 and the lateral mold element, vulcanization is assured between the outer sole and the confronting inner sole as well as between the outer sole and the outer edges 43' of the lateral sole. If the elastomer and the mixture reacting into polyurethane contain the appropriate additives, the chemical bonds between the reacting mixture, the lateral sole and the outer sole are also simultaneously formed. Likewise, welding as a consequence of a partial lattice-like polymerization of the elastomer and the thermoplastic, still in a sticky condition and enhanced with As high peak pressures occur during the injection of outer soles of the elastomer, comparable to those peak pressures which take place in injection molding machines for the processing of plastic material, the usual drive cylinders and mold locking cylinders are required similar to those employed in such injection molding machines.

As can be seen in FIGS. 3a, 3b during injection of the plasticized elastomer during the manufacture of the lateral sole, the force of the reaction is applied via undersurfaces 31 which define a shoulder against which plate 21 bears. The force of the reaction is similarly applied via this shoulder during injection molding of the outer sole.

FIGS. 3a, 3b illustrate the relative positions of the cross blocks of the molding apparatus 2 at station $2_{01}$ (see FIG. 2).

At this station the plastification and injection aggregate device 3 is radially moved toward the turntable and abuts a sprue bore hole (not shown) of mold nest 30 for injection molding the lateral sole. This mold nest remains closed until, after a corresponding number incremental moves of the turntable, the molding apparatus at station $2_{01}$ has reached station $2_{11}$ after passing through stations $2_{02}$ through $2_{10}$. At station $2_{11}$ the pistons of units 15, 16 are retracted causing cross blocks 12 and 9 to lower for retracting the mold carrier to its FIG. 4 position at which it is shown having been rotated clockwise through 90°.

In position $2_{11}$ the pistons of units 15, 16 are extended for raising blocks 9 and 12 and for extending the mold carrier to its FIG. 5 position at which the inner sole is injection molded by operation of device 4. At position $2_{11}$ the outer sole is simultaneously molded by operation of device 3'.

The pistons of units 15, 16 and of mold locking cylinder 13 are then retracted for lowering blocks 9 and 12 to their FIG. 6 position after which the mold carrier is rotated through 180° while at position $2_{14}$. At this position the pistons of units 15, 16 are then extended for raising cross blocks 9, 12 and for extending the mold carrier to its FIG. 7 position. In this position the molding apparatus is moved into its position $2_{01}$ from position $2_{14}$. In this position the lateral sole and outer sole are in confronting relationship and are bonded together by full vulcanization at their contact areas.

From the above description it can be clearly seen that in the stationary position of the circular turntable the outer sole and the inner sole are simultaneously injection molded and, at the same time, in the area between positions 2₀₄ or 2₁₄ a finished shoe having a molded outer sole of elastomer and an inner sole of polyurethane is removed at a discharge station (not shown).

Figure 8:
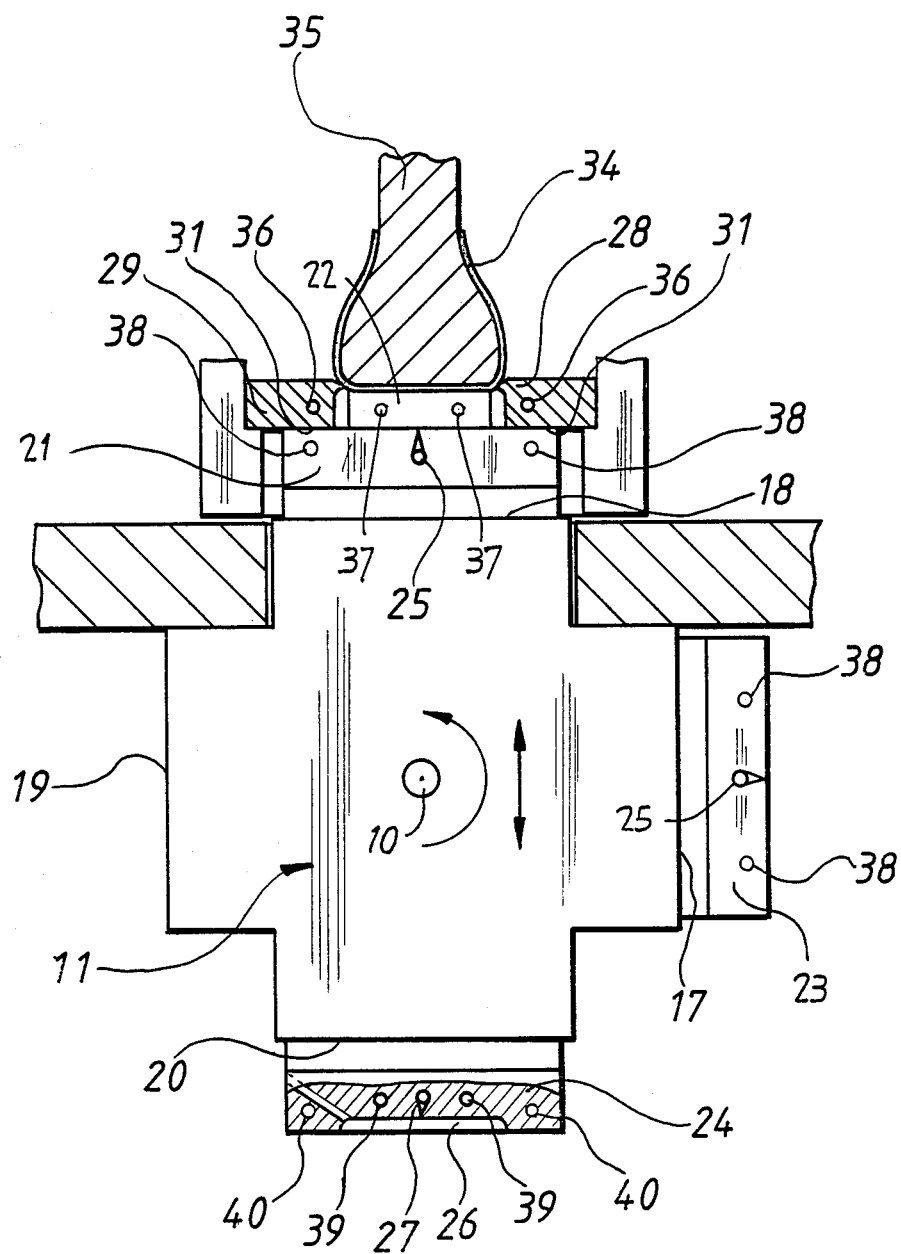
FIG. 8 is a view similar to FIG. 3b of another embodiment of the mold carrier according to the invention.
Figure 9:
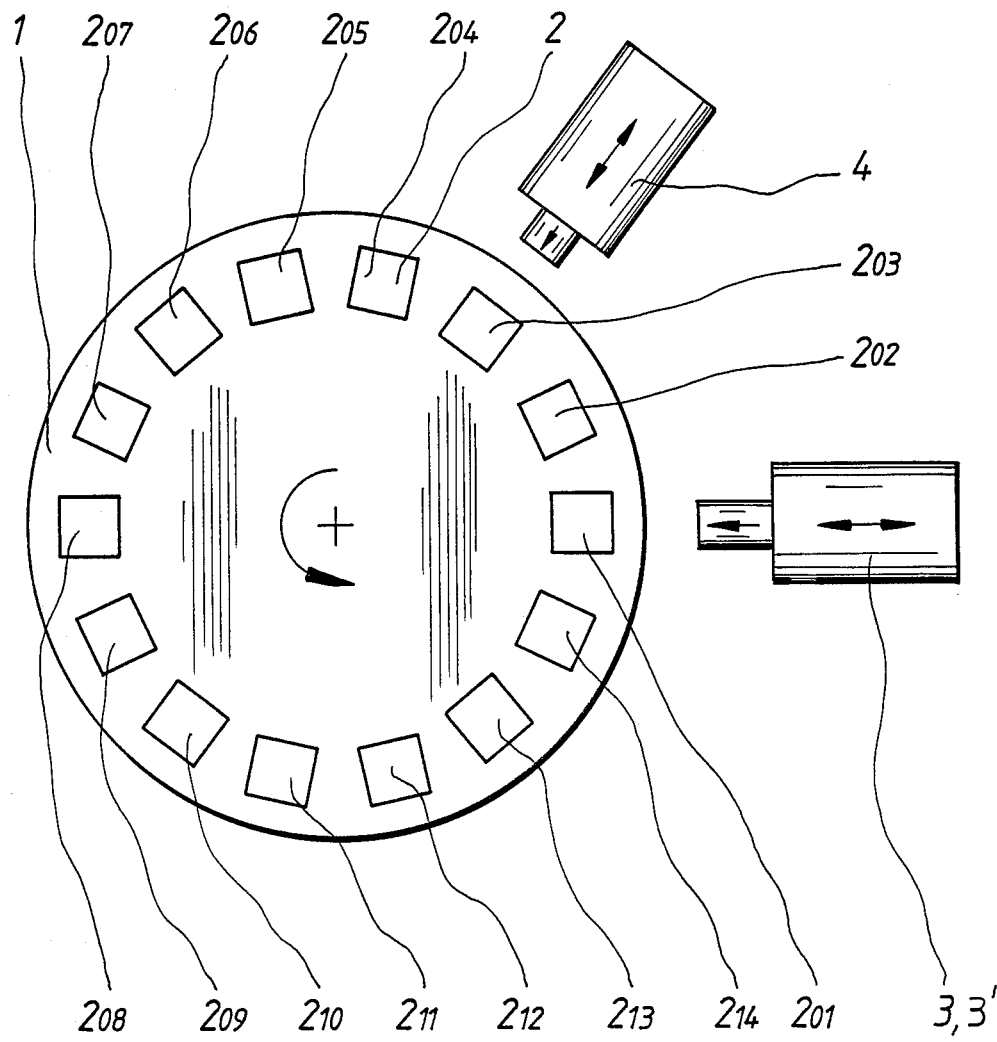
FIG. 9 is a view similar to FIG. 2 of another circular turntable arrangement according to the invention.

Another embodiment of the present apparatus is illustrated in the FIG. 8 which employs the same mold carrier 11 shown in FIG. 3b except that plate 21 with its mold part 22 is mounted on surface 18 of the mold carrier, and plate 23 is mounted on surface 17 of the mold carrier. Otherwise, the parts identified by the same reference numerals are the same as in FIG. 3b. With the FIG. 8 arrangement, the lateral sole and the outer sole are capable of being injection molded simultaneously at the same position on the circular turntable. Thus, the two plastification and injection aggregate devices 3,3' are arranged in FIG. 9 one above the other, i.e., device 3 above device 3', so as to be moved together radially inwardly toward the turntable for simultaneously injection molding the respective lateral and outer soles. After such simultaneous injection molding operation, the mold carrier is then rotated and extended such that mold part 23 engages the undersurfaces of the lateral mold elements for effecting injection molding of the inner sole, followed by retraction, rotation and extension of the mold carrier into a position such that mold part 24 disposes the molded outer sole against the common zones of contact with the lateral and inner soles for bonding thereto through full vulcanization, as aforedescribed.

A circular turntable has been described as rotatable through short increments, although it is within the scope of the invention to also provide individual mold stations located on a turntable. In such arrangement, device 4 for mixing the mixture reacting into the polyurethane and device 3 would be arranged one above the other or diametrically opposite one another.

What is claimed is:

1. Apparatus for molding outer, inner and lateral soles on to shoe uppers, comprising an upstanding frame structure including a vertically movable upper cross block, a mold carrier mounted on said cross block for pivotal movement about a transverse axis, said mold carrier having a first pair of opposed outer surfaces and a second pair of opposed outer surfaces perpendicular to said first surfaces, a pair of opposing lateral mold elements mounted on said frame structure above said upper cross block, a shoe last on a shoe last holder mounted on said frame, said lateral mold elements being spaced apart in a closed position against said last, a heatable first mold part on one of said first surfaces projectable in a first position into the spacing between said lateral mold elements to define therewith a lateral sole mold cavity into which an elastomer is injected to form a lateral sole, said lateral mold elements and said first mold part having heating and cooling channels to effect full vulcanization of said lateral sole except along an edge thereof facing said first mold part, a second mold part on one of said second surfaces engageable in a second position with undersurfaces of said lateral mold elements to define with the interior of the lateral sole and with the shoe last an inner sole cavity into which one of a thermoplastic and a mixture of isocyanate and a polyol reacting into polyurethane is injected to form an inner sole, a third mold part mounted on the other of said second surfaces, a vertically movable lower cross block having a plate engageable in said second position with said third mold part to define therewith an outer sole cavity into which an elastomer is injected to form an outer sole simultaneously with formation of the inner sole, said plate and said third mold part having heating and cooling channels to effect full vulcanization of said outer sole in said second position except at a peripheral portion of said outer sole, said mold part being engageable in a third position with said undersurfaces for placing the outer sole into engagement with said inner and lateral soles, said heating and cooling channels in said third mold part and in said lateral mold elements effecting vulcanization in said third position between said peripheral position of said outer sole and said edge of said lateral sole, and between said outer and inner soles, and means for pivoting said mold carrier between said first, second and third positions.

2. The apparatus according to claim 1, wherein said mold parts and elements include means for vulcanizing the soles.

3. Apparatus for molding outer, inner and lateral soles on to shoe uppers, comprising an upstanding frame structure including a vertically movable upper cross block, a mold carrier mounted on said cross block for pivotal movement about a transverse axis, said mole carried having a first pair of opposed outer surfaces and a second pair of opposed outer surfaces perpendicular to said first surfaces, a pair of opposing lateral mold elements mounted on said frame structure above said upper cross block, a shoe last on a shoe last holder mounted on said frame, said lateral mold elements being spaced apart in a closed position against said last, a heatable first mold part on one of said second surfaces projectable in a first position into the spacing between said lateral mold elements to define therewith a lateral sole mold cavity into which an elastomer is injected to form a lateral sole, said lateral mold elements and said first mold part having heating and cooling channels to effect full vulcanization of said lateral sole except along an edge thereof facing said first mold part, a second mole part on one of said first surfaces engageable in a second position with undersurfaces of said lateral mold elements to define with the interior of the lateral sole and with the shoe last an inner sole cavity into which a thermoplastic is injected to form an inner sole, a third mold part on the other of said second surfaces, a vertically movable lower cross block having a heat plate engageable in said second position with said third mold part to define therewith an outer sole cavity into which an elastomer is injected to form an outer sole simultaneously with formation of the lateral sole, said plate and said third mold part having heating and cooling channels to effect full vulcanization of said outer sole in said second position except at a peripheral portion of said outer sole, said third mold part being engageable in a third position with said undersurfaces for placing the outer sole into engagement with said inner and lateral soles, said heating and cooling channels in said third mold part and in said lateral mold elements effecting vulcanization in said third position between said peripheral position of said outer sole and said edge of said lateral sole, and between said outer and inner soles, and means for pivoting said mold carrier between said first, second and third positions.

4. The apparatus according to claim 3, wherein aid mold parts and elements include means for vulcanizing the soles.

* * * * *